July 19, 1949.  J. D. LANGDON  2,476,310
VALVE CONSTRUCTION
Filed Dec. 5, 1944
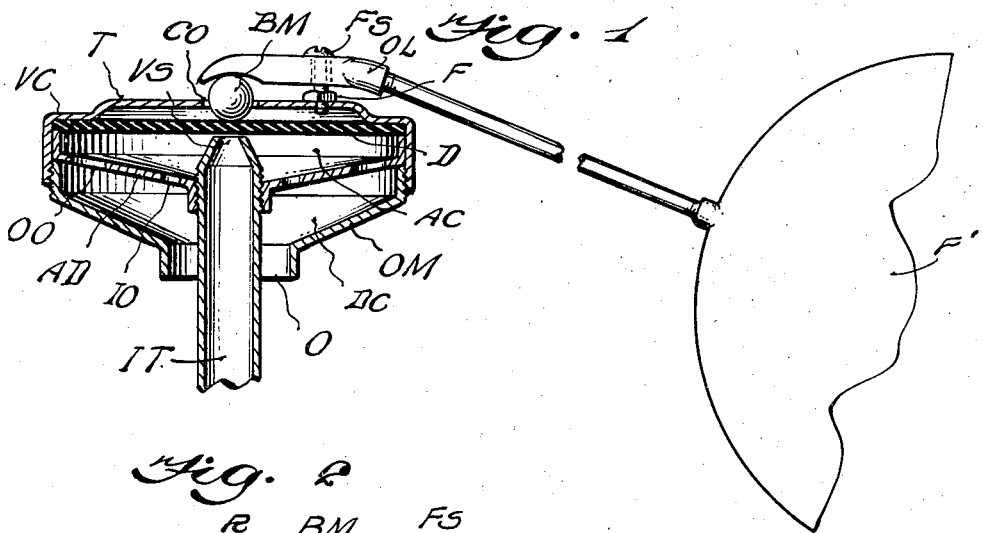
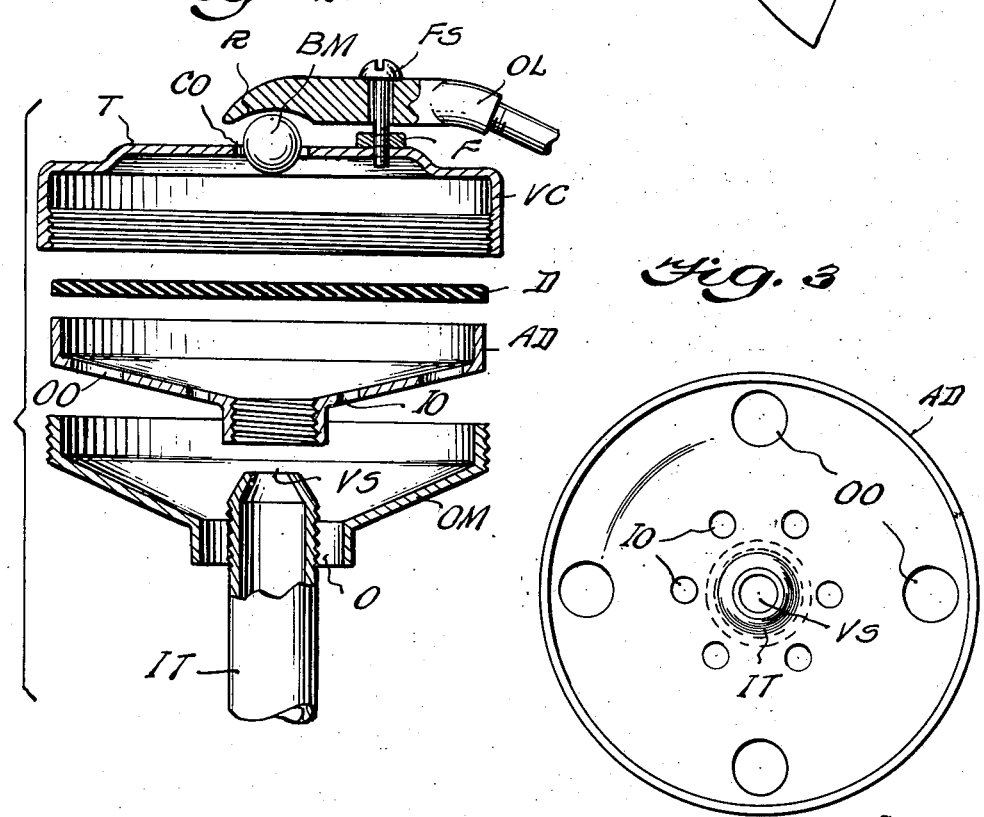
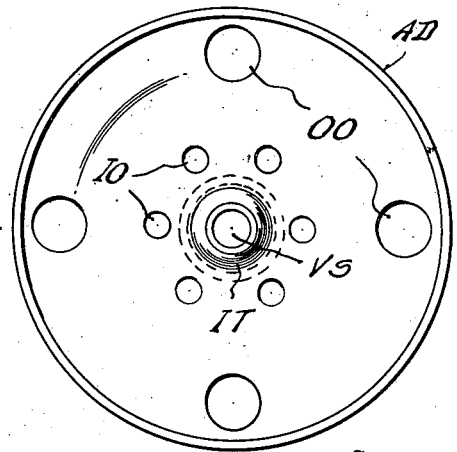
Inventor
J. D. Langdon Patented July 19, 1949

2,476,310

UNITED STATES PATENT OFFICE 2,476,310

VALVE CONSTRUCTION

Jesse D. Langdon, Long Beach, Calif.

Application December 5, 1944, Serial No. 566,653

6 Claims. (Cl. 251—133)

The instant invention is a continuation in part of and relates to valve construction particularly amenable to sheet metal stampings or to be formed out of plastic material.

The primary object of the invention is to provide means to reduce the velocity of liquid under pressure and distribute the flow thereof evenly down the outer wall of a supply tube connected to the valve constituting the invention.

Another object is to provide an assembly member for attaching a valve of the nature described and suspending the same upon a supply tube attached thereto whereby the various parts are held in concentric relationship to one another.

A further object is to provide a self centering valve closing member and sealing means therefor to prevent leakage around the member.

A still further object is to eliminate a cross connection between a supply line and a sewer connected fixture.

Other and further objects will appear during the progress of the specification as illustrated by the drawings which it is specifically understood to show only one form of reduction to practice and may be changed within the scope of the claims.

Of the drawings:

Fig. 1 is a sectional elevation of the complete valve construction.

Fig. 2 is an enlarged sectional view of the various parts of the valve disassembled and placed in sequential relationship to one another.

Fig. 3 is a plan view of the assembly disc AD looking toward the top.

The valve construction consists of an inlet tube IT, having threadedly disposed thereon an assembly disc AD having the center thereof flanged downwardly forming an opening threaded to screw on the inlet tube a distance limited by the number of threads on the latter to hold a proper relationship between the top of the inlet tube IT and the top of the disc AD which is flanged upwardly around its outer periphery. A diaphragm D having an outer diameter substantially that of the disc AD is placed thereon. A valve cap VC is slidably placed over the diaphragm D and the disc AD, the cap VC having a peripheral wall somewhat longer than the upwardly turned flange of the disc AD. The lower inner circumference of the cap VC is internally threaded to permit the outlet member OM which is externally threaded around its upper outer circumference to screw into the cap VC. The outlet member OM is funnel shape in form and has an outlet opening O somewhat larger in diameter than the inlet tube IT which forms a valve seat as well as a supply tube for the valve. The valve seat VS formed by the tube IT normally lies against the diaphragm D when in assembled position. The valve cap VC has an opening in the center thereof in that portion constituting the top T which is cupped upwardly for a distance to permit the diaphragm D to rise away from the valve seat VS which allows liquid under pressure to be projected radially outward beneath the same. A ball member BM is inserted in a central opening thru the top T of valve cap VC. The central opening CO is slightly larger than the diameter of the ball BM to permit the latter to find the valve seat VS at all times even tho there is a lack of concentricity between the valve cap VC and the valve seat VS. The ball member BM is held in operative position by operating lever OL which in turn is held in position by fulcrum screw FS which is secured thru the top of the cap VC there being a fulcrum ring F disposed beneath the operating lever OL which has an opening therethru somewhat larger than the shank of the fulcrum screw FS permitting a limited movement of the operating lever OL. The end of the lever OL is recessed to receive a portion of the ball BM, the rim of the recess R projecting a sufficient distance around the ball in a downward direction to prevent the ball BM from coming out of the central opening CO when the operating lever OL is in assembled position. The assembly disc AD as of Fig. 3 is shown to have two sets of openings therethru, inner openings IO located adjacent the outlet O surrounding the tube IT and outer openings OO located near the outer circumference of the disc AD. The openings IO and OO permit the flow of fluid from the inlet IT to run downwardly into the funnel shaped outlet member which provides the outlet O which may be as many times larger than the inlet IT as desired to slow up the movement of liquid thru the accumulating chamber AC formed by the upwardly projecting portion of the disc AD spacing same away from the diaphragm D.

The operation of the device is substantially as follows: The inlet tube IT is designed to stand upright in a tank and the operating lever OL being attached to a float F which drops when there is no liquid in the tank leaving the diaphragm D free to permit the passage of liquid under pressure into the greatly enlarged accumulation chamber AC which slows down the velocity of the liquid passing thru the openings OO and IO downwardly into drain chamber DC formed by outlet member OM where the flow of liquid is further slowed up due to the fact that the openings OO and IO have an aggregate capacity less than the outlet O creating a lower pressure area in the chamber DC which is larger than the chamber AC. The proportions of the various chambers and openings in relation to one another may be varied to suit the contigencies of use. Slots or triangular ports may be used in lieu of the openings OO and IO.

Attention is called to the fact that the inlet tube IT is threadedly inserted thru the assembly disc or member AD and that the height of the seat above the member AD may be changed to increase or decrease the distance the diaphragm D must move to engage the valve seat VS.

In order to obviate any cross connection between the outlet O and the liquid level in a tank, an overflow must be provided from the tank to hold the surface level of liquid a sufficient distance below the outlet O to prevent backflow when any degree of vacuum is applied from the inlet IT if the check valve formed by the diaphragm D and supplemented by the ball member BM is mechanically held away from the seat VS.

In any event in the absence of some foreign substance between the diaphragm D and the valve seat VS the valve is normally closed being an effective check valve to prevent backflow from atmospheric pressure.

Having described my invention and the operation thereof the following claims are made:

1. A valve construction including a series of sheet metal stampings, comprising a perforated disc-shaped assembly element formed with a peripheral rim supporting a diaphragm forming a valve member, the center of the assembly element having an inlet tube connectedly inserted therethru, the periphery of said peripheral rim formed by an upturned wall providing spacing means forming the outer wall of a chamber located between said diaphragm and said assembly element to accumulate a body of liquid, a valve cap having a narrow margin near the periphery thereof adapted to impinge said diaphragm near its outer circumference to hold the same against the peripheral rim of said assembly element; an outlet member impinging said assembly element and having a floor and including spacing means attached to said cap and together with said assembly element defining a second chamber between the floor thereof and the perforated disc forming the said assembly element, an outlet opening formed thru said outlet member and having a rim projecting forwardly circumscribing said inlet tube and forming an annular port to project liquid around the outer surface of said inlet tube, said cap having a ball valve-operating member disposed in a perforation through said cap surrounding and clearing the ball whereby said ball is permitted to roll into position coaxially of a valve seat formed at the proximal end of said inlet tube closed by the valve member formed by said diaphragm, a valve operating lever pivotally attached to said cap and impinging the ball and forming means to retain said ball in operative position and actuate the valve member.

2. A valve constructed of material capable of being pressed to form and holding shape after being formed, comprising a casing constituted by an outlet portion and a cap, a diaphragm of flexible material disposed within said casing and impinged between said cap and a perforated assembly member, said assembly member attached to, superimposed upon and projecting radially outward of a supply tube extended thru said assembly member; said supply tube forming an inlet and a valve seat for said diaphragm; conjoining means between said outlet portion and said cap for compressing and holding the outer edges of said diaphragm and said assembly member secured between said cap and said outlet portions of said casing, said cap being perforated, a ball forming a valve actuator disposed thru the perforation in said cap and resting against said diaphragm, the perforation thru the cap being large enough to permit the ball to move laterally and roll freely toward the center of said valve seat, a pivotally disposed valve actuating lever impinging said ball and holding said ball against said diaphragm, a chamber formed between said diaphragm and the assembly member and surrounding said valve seat, a second chamber formed between said assembly member and said outlet portion, an outlet port disposed thru said outlet portion and circumscribing said inlet tube, whereby the velocity of pressure liquid passing from the inlet into the first named chamber is slowed up by the baffle effect of the perforated assembly member and the velocity of liquid passing thru the second named chamber is reduced before passing from the outlet.

3. A valve construction formed of sheet metal and comprising an inlet tube forming a valve seat projecting thru a perforated disc-like assembly member, a diaphragm made of flexible material superimposed on the valve seat and the assembly member; an outlet portion with an outlet port circumscribing said inlet tube, a valve cap surmounting said diaphragm and said assembly member, clamping means formed by said outlet portion and said cap, whereby the outer edges of said diaphragm and said assembly member are held in assembled relationship, a diaphragm closing element loosely disposed thru a perforation in said cap and resting against said diaphragm and held in operative position by a pivotally fulcrumed operating lever; the loosely disposed diaphragm closing element being capable of lateral movement within the confines of the perforation thru said cap, a chamber surrounding said valve seat between said diaphragm and said assembly member and including a second chamber between said assembly member and said outlet portion, whereby the velocity of pressure fluid flowing from said outlet will be substantially diminished.

4. A valve construction comprising an inlet tube, a perforated disc-shaped assembly member mounted on the tube, an inlet port and valve seat formed by said tube centrally of the assembly member, an outlet member impinged against and supporting said assembly member and having a floor with a centrally disposed outlet port therethru surrounding said inlet tube, a disc-shaped cap surmounting a diaphragm supported by said assembly member connectedly attached to said outlet member, said assembly member being embraced between said outlet member and said cap, said outlet member and said cap forming means closely binding the periphery of said assembly member and said diaphragm together, the above recited elements connectedly assembled into a unitary organization whereby said diaphragm secured between said cap and said assembly member forms a valve member for closing said inlet port, said cap being centrally perforated and having a valve actuating member disposed therethru together with lever means attached to said cap and impinging the valve actuating member to hold the same in operative position and actuate the same against said diaphragm to close said inlet port.

5. A valve construction as defined by claim 4 wherein the valve actuating member disposed thru the perforated cap is in the form of a ball of smaller diameter than the perforation, whereby the ball is permitted to move to a centralized position with relation to the inlet port for alignment with the valve seat formed by the proximal end of the inlet tube.

6. A valve construction as defined by claim 4 wherein the inlet tube is threadedly inserted thru the assembly member for adjustable movement thru said assembly member whereby the height of the seat may be changed with relation to the assembly disc and the diaphragm and whereby the valve opening between said seat and said diaphragm may be adjusted to control the flow of liquid thru the valve.

JESSE D. LANGDON.

REFERENCES CITED

The following references are of record in the file of this patent:

UNITED STATES PATENTS

| Number | Name | Date |
|---|---|---|
| 538,802 | Sullivan | May 7, 1895 |
| 1,641,756 | Haas | Sept. 6, 1927 |
| 1,999,904 | Helfrick | Apr. 30, 1935 |
| 2,046,792 | Schmiedeknecht | July 7, 1936 |